United States Patent [19]

Day

[11] 3,901,563

[45] Aug. 26, 1975

[54] HYDROMECHANICAL RECOIL AND TRACK ADJUSTER SYSTEM

[75] Inventor: Dennis M. Day, Hinckley, Ill.

[73] Assignee: Caterpillar Tractor Company, Peoria, Ill.

[22] Filed: May 17, 1974

[21] Appl. No.: 470,844

[52] U.S. Cl. .............. 305/10; 305/31; 74/242.1 FP
[51] Int. Cl.² ......................................... B62D 55/30
[58] Field of Search ............ 305/10, 29, 30, 31, 32, 305/47; 74/242.14 R, 242.1 FP

[56] References Cited
UNITED STATES PATENTS

| | | | |
|---|---|---|---|
| 3,332,725 | 7/1967 | Reinsma | 305/10 |
| 3,409,335 | 11/1968 | Picpho | 305/10 |
| 3,539,229 | 11/1970 | Scully | 305/10 |
| 3,574,418 | 4/1971 | Okabe | 305/10 |
| 3,645,586 | 2/1972 | Picpho | 305/10 |
| 3,647,270 | 3/1972 | Althaus | 305/10 |
| 3,733,107 | 5/1973 | Cote | 305/10 |

*Primary Examiner*—Philip Goodman
*Assistant Examiner*—John A. Carroll
*Attorney, Agent, or Firm*—Ralph E. Walters

[57] ABSTRACT

A hydromechanical adjusting and recoil apparatus for use with crawler vehicles and the like. The apparatus automatically adjusts the tension in the track of the vehicle and accommodates passage of foreign objects by means of momentary recoil for preventing breaking of the chain and associated elements. The track tension is maintained by adjustment of a reciprocably supported idler wheel which is connected to the adjusting and recoil apparatus to provide the desired automatic control of the track tension. The apparatus includes hydraulically operated pistons for controlling the force applied to the idler. The apparatus utilizes a spring for accumulating transient force energy and automatically returning the apparatus to the normal operating condition.

14 Claims, 2 Drawing Figures

PATENTED AUG 26 1975　　　　　　　　　　　　　　　3,901,563

HYDROMECHANICAL RECOIL AND TRACK ADJUSTER SYSTEM

BACKGROUND OF THE INVENTION

1. Field of the Invention

This invention relates to adjusting and recoil apparatus and in particular to such apparatus for use with crawler vehicle tracks.

2. Description of the Prior Art

In the conventional crawler-type tractor, the undercarriage is subject to substantial wear as a result of the severe operating environment. Notwithstanding the use of relatively expensive wear-resistant materials and wear-resisting treatment of the elements, rapid wear of track rollers, drive sprockets, pins, bushings, track links, and shoes occurs in the normal use of the tractor. Such wear causes slack to occur in the track chains. To accommodate such wear, idler wheels are conventionally utilized which are periodically adjusted to take up such slack. Failure to take up such slack not only causes accelerated wear, but may also cause loss of the track chains from high side loads during the turning of the tractor.

It is difficult to provide constant preventive maintenance under the operating environmental conditions which may conventionally cause coating of the undercarriage with layers of mud and/or ice. While a number of manually operated hydraulic track adjusting apparatuses have been developed, these have not proven completely successful because of the adverse environmental conditions.

Another problem in the use of the track chain systems is the occasional passage of relatively unbreakable foreign objects, such as rocks and the like, between the track chain and the sprocket or idler which tends to either break the chain or other associated elements of the system.

Still another problem encountered in conventional track systems is the substantial forces generated by the track chain against the idler when the tractor is being operated in reverse. To accommodate the passage of such foreign objects and the substantial forces encountered by the idler in reverse operation of the tractor, recoil means have been provided for the idler. Conventionally, large recoil springs have been used which are relatively expensive, require substantial space in the tractor apparatus, and are relatively difficult to assemble therein.

More recently, a number of devices have been developed for automatically adjusting the track tension. Illustrative of such devices are those disclosed in the following United States Letters Pat. Nos.: 2,561,901 (Bachman et al.); 2,818,311 (Ashley, Jr.); 2,837,379 (Selyem et al.); 3,409,335 (Piepho et al.); 3,539,229 (Scully); 3,574,418 (Okabe); and 3,645,586 (Piepho).

A similar track tensioning means is illustrated in the British patent of Orenstein et al. 1,292,283 (1972).

SUMMARY OF THE INVENTION

The present invention comprehends an improved track tension adjusting and recoil apparatus which is extremely simple and economical of construction while yet providing improved functioning and long maintenance-free life. The apparatus of the present invention is extremely compact and is adapted for ready installation on a tractor or the like.

Briefly, the present invention comprehends such a track adjusting and recoil apparatus utilizing a hydraulic piston means in combination with a spring force accumulator for providing the improved control of the track chain, as discussed above.

The cylinder means of the apparatus defines first and second chambers with a first piston movable in the first chamber for adjusting and accommodating recoil from the idler means. Fluid is provided in the first chamber at a preselected pressure to urge the piston outwardly and thereby provide the desired track tensioning force through the idler means. A second piston is received in the second chamber and is normally biased inwardly by a suitable spring. Fluid is transferred from the first chamber into the second chamber to urge the second piston outwardly against the spring biasing action when a high force is transmitted from the idler to the first piston such as by a foreign object passing between the track chain and idler sprocket. This transient force is stored momentarily in the spring and returned to the system by the biasing action of the spring returning fluid from the second chamber back to the first chamber when the pressure in the first chamber drops to the normal operating pressure.

The invention further comprehends the provision of fluid replenishing means for maintaining the force transfer fluid in the first chamber at the desired preselected pressure for maintaining the desired tension in the track chain.

Thus, the adjusting and recoil apparatus of the present invention provides a substantial improvement over the relatively costly and high maintenance-requirement apparatuses of the prior art.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
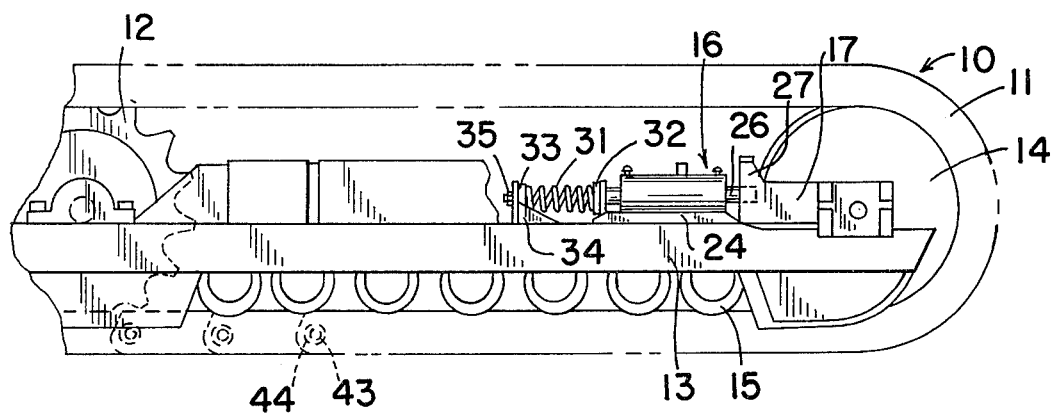
FIG. 1 is a fragmentary schematic side elevation of a crawler vehicle undercarriage provided with a track adjusting and recoil apparatus embodying the invention.

In the exemplary embodiment of the invention as disclosed in the drawing, a conventional crawler tractor undercarriage generally designated 10 is shown to comprise an endless track chain 11 which is driven by a drive sprocket 12. The track chain is supported at the distal end of a track roller frame 13 by an idler wheel 14. The roller frame is provided with a plurality of track rollers 15 for supporting the tractor on the track chain. In the conventional tractor, a pair of such undercarriages 10 is provided being disposed one each on opposite sides thereof to provide support and permit steering of the tractor by suitable control of the driven tracks.

The present invention is concerned with the provision of improved means generally designated 16 for adjusting the idler wheel 14 suitably to provide desired track tension and eliminate slack in the operation of the tractor. The adjusting means are further adapted to provide improved recoil of the idler wheel for preventing damage to the track or idler as by passage of foreign objects therebetween in the operation of the tractor. Apparatus 16 is connected to the idler wheel 14 by a support yoke 17 slidably carried on the forward end of frame 13 to provide the desired movable mounting of the idler wheel.

Figure 2:
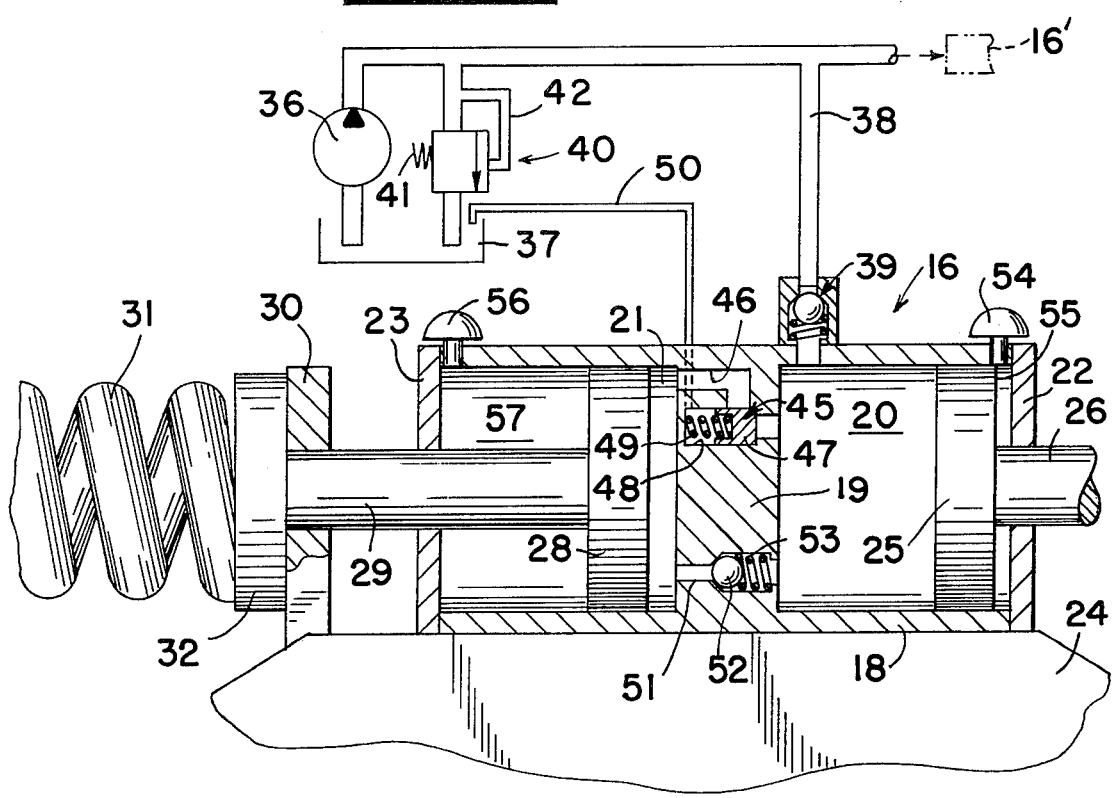
FIG. 2 is an enlarged fragmentary vertical section of the adjusting and recoil apparatus with the hydraulic fluid supply illustrated schematically.

Referring now to FIG. 2, the adjusting apparatus 16 is shown to comprise a cylinder 18 having a transverse center dividing wall 19 and defining opposite first and second chambers 20 and 21, respectively. Chamber 20 is outwardly closed by a closure plate 22 and chamber 21 is outwardly closed by a closure plate 23. Cylinder 18 is fixedly secured to roller frame 13 by a suitable bracket 24.

A first piston 25 is disposed in chamber 20 and is provided with a rod 26 extending outwardly therefrom through closure plate 22. Rod 26 is fixedly secured to support yoke 17 by a suitable lock 27.

A suitable piston 28 is disposed in chamber 21 and is provided with a rod 29 extending outwardly through closure plate 23 and through a stop bracket 30 fixedly carried by bracket 24.

A recoil spring 31 is provided at its opposite ends with end caps 32 and 33. End cap 32 is secured to the distal end of rod 29 outwardly of stop bracket 30, and outer end cap 33 is secured to a retainer bracket 34 by suitable threaded means 35. Retainer bracket 34 is fixedly secured to roller frame 13, as shown in FIG. 1.

A suitable fluid, such as a hydraulic fluid, is provided to chamber 20 under a preselected pressure for urging piston 25 outwardly and thereby transmitting a suitable force through rod 26, support yoke 17, and idler wheel 14 to maintain a desired tension in the track chain 11. As shown in FIG. 2, the pressurized fluid is provided to chamber 20 by a conventional engine powered pump 36 arranged to pump the fluid from a sump 37 through a delivery conduit 38 to chamber 20. A ball spring check valve 39 is provided in duct 38 for preventing return flow of fluid from chamber 20. The desired fluid pressure is maintained by a conventional pressure regulating valve generally designated 40 which may be provided with a manually adjustable spring 41 and a conventional pressure sensing feedback circuit 42. As shown in FIG. 2, the pressure regulating means is arranged to dump excess fluid back to the sump 37 for recirculation by pump 36 in accurately maintaining the selected pressure.

Thus, in normal operation, idler wheel 14 is biased by piston 25 to provide a preselected tension in the track chain 11. As wear on the hinge pins 43 and bushings 44 of the track chain 11 occurs, the resulting slack in the track chain is taken up by the outward movement of piston 25 by delivery of a suitable additional quantity of pressurized fluid from pump 36 to chamber 20, while maintaining the selected pressure to maintain automatically the selected tension in the track chain.

Apparatus 16 further provides an automatic recoil function permitting the idler wheel 14 to move momentarily suitably to pass foreign objects, such as rocks and the like, causing a momentary, or transient, high force on the idler, track and associated apparatus. When such a high transient force occurs, the force is transmitted from the idler through support yoke 17 and rod 26 to piston 25 in chamber 20, thereby increasing the pressure of the fluid therein. As shown in FIG. 2, a pressure relief valve 45 is provided in a passage 46 extending through the dividing wall 19 to permit fluid flow from chamber 20 to chamber 21 as an incident of the high pressure condition. In the illustrated embodiment, the pressure relief valve is set to open at a pressure of several thousand p.s.i. As shown, the valve 45 may include a movable valve member 47 received in a recess 48 opening to passage 46. A biasing spring 49 is compressed between the movable valve member 47 and the bottom of the recess to bias the valve to the normally closed condition, as shown in FIG. 2. To prevent pressure buildup behind valve member 47, recess 48 may be suitably vented to sump 37 by a vent duct 50.

When the fluid pressure in chamber 20 reaches the relief pressure of valve 45, the valve unseats to pass fluid under this high pressure into chamber 21 and thereby urge piston 28 to the left, as seen in FIG. 2, against the biasing action of recoil spring 31. At this time, check valve 39 prevents flow of high pressure fluid from chamber 20 into the fluid supply duct 38 so that the entire transient force energy is effectively stored in spring 31.

When the foreign object passes from between idler wheel 14 and track chain 11 to remove the transient force on piston 25, the piston is urged back to the original operating position, such as that illustrated in FIG. 2, by a return of the fluid from chamber 21 to chamber 20 through a return passage 51 in divider wall 19 provided with a suitable ball check valve 52 having a relatively light biasing spring 53. As the pressure of the fluid is maintained by spring 31 at above the normal pressure provided by pump 36 to chamber 20, all of the fluid transferred by the transient condition is restored to chamber 20 by the return of spring 31 to the relaxed position of FIG. 2 whereby piston 25 is again disposed as shown in the normal track tensioning position.

As shown in FIG. 2, a vent 54 is provided for venting the space 55 in chamber 20 outwardly of piston 25, and a vent 56 is provided for venting the space 57 in chamber 21 outwardly of piston 28.

Thus, apparatus 16 normally maintains a preselected tension in track chain 11 as selected by the adjustment of the pressure of the fluid supply to chamber 20. This tension is maintained notwithstanding a wear in the track chain elements as such wear is accommodated by an outward movement of piston 25 effected by provision of additional pressurized fluid to chamber 20 as necessary. Thus, the tension in the track chain is automatically maintained for improved long life and minimized maintenance. When excessive rolling resistance or track tension occurs, such as when the track engages an obstruction or a foreign object passes between the track chain and idler, a pressure buildup in chamber 20 occurs. If the overload on the track chain is very momentary, the idler is maintained in its normal position so as to avoid relaxation of the track tension or permission of slack formation in the track chain. Similarly, where the foreign object is frangible, the momentary high force is permitted to effect the breaking thereof without repositioning the idler 14. However, when the pressure builds up sufficiently to open the relief valve 45, idler 14 is permitted to move suitably by the transfer of fluid from chamber 20 to chamber 21. Chamber 21 functions as an accumulator chamber in accumulating the transfer pressurized fluid from chamber 20, and spring 31 acts as a pressure regenerating means adapted to restore the apparatus 16 to the normal operating arrangement subsequent to the momentary high force condition.

As indicated above, the tractor is conventionally provided with a pair of such undercarriage structures and correspondingly, a second apparatus 16' similar to apparatus 16 may be provided for use with the other undercarriage structure, utilizing the common pressurized fluid system, as shown in FIG. 2.

The foregoing disclosure of specific embodiments is illustrative of the broad inventive concepts comprehended by the invention.

I claim:

1. An adjusting and recoil apparatus comprising: cylinder means defining first and second chambers; a first piston reciprocable in said first chamber for adjusting and accommodating recoil from a movable element; a second piston reciprocable in said second chamber; means biasing said second piston inwardly; means for providing fluid at a preselected pressure to said first chamber for urging said first piston outwardly; means providing a flow passage from said first chamber to said second chamber including a pressure regulating valve permitting fluid flow from said first chamber to said second chamber to urge said second piston outwardly against the biasing of said biasing means only when the pressure in said first chamber is caused to be a relief pressure substantially above said preselected pressure, forces from said movable element being accommodated by said fluid in said first chamber when the pressure is below said relief pressure; and means for providing a return flow of fluid from said second chamber to said first chamber as a result of the fluid pressure in said second chamber caused by the biasing of said second piston by said biasing means causing said second piston to provide a pressure in said second chamber exceeding the fluid pressure in said first chamber.

2. The adjusting and recoil apparatus of claim 1 wherein said flow passage and pressure relief means are disposed within said cylinder means.

3. The adjusting and recoil apparatus of claim 1 wherein said means biasing said second piston comprises a spring.

4. The adjusting and recoil apparatus of claim 1 wherein said cylinder means includes a dividing wall, said chambers extending oppositely outwardly from said wall.

5. A track idler adjusting and recoil apparatus comprising: a cylinder having wall means defining first and second chambers; a first piston reciprocable in said first chamber for movement by a track idler means; a second piston reciprocable in said second chamber; means biasing said second piston inwardly; means for providing fluid at a preselected pressure to said first chamber for urging said first piston outwardly to apply a track tensioning force to the idler; means providing a flow passage from said first chamber to said second chamber including a pressure regulating valve permitting fluid flow from said first chamber to said second chamber to urge said second piston outwardly against the biasing of said biasing means only when the pressure in said first chamber is caused to be a relief pressure substantially above said preselected pressure, forces from said movable element being accommodated by said fluid in said first chamber when the pressure is below said relief pressure; and means for providing a return flow of fluid from said second chamber to said first chamber as a result of the fluid pressure in said second chamber caused by the biasing of said second piston by said biasing means causing said second piston to provide a pressure in said second chamber exceeding the fluid pressure in said first chamber and permitting said means for providing fluid to said first chamber to maintain the track tensioning force on the idler means.

6. The track idler adjusting and recoil apparatus of claim 5 wherein said biasing means comprises a spring.

7. The track idler adjusting and recoil apparatus of claim 5 wherein said biasing means comprises a spring mounted exteriorly of said cylinder.

8. The track idler adjusting and recoil apparatus of claim 5 wherein said fluid providing means comprises a pressure regulated pump means.

9. The track idler adjusting and recoil apparatus of claim 5 wherein said fluid providing means includes check valve means for preventing fluid flow from said first chamber to said fluid providing means when inward urging of said first piston by said track idler means causes the fluid pressure in said first chamber to exceed said preselected pressure.

10. The track idler adjusting and recoil apparatus of claim 5 wherein said means for providing a return flow comprises a passage through said wall means provided with a check valve.

11. The track idler adjusting and recoil apparatus of claim 5 wherein means are provided for venting the spaces in said cylinder outwardly of said pistons.

12. The track idler adjusting and recoil apparatus of claim 5 wherein said pressure regulating valve includes a movable valve member received in a recess, spring means biasing the movable valve member outwardly from said recess to a closed condition, and means for venting the recess inwardly of the movable valve member.

13. The track idler adjusting and recoil apparatus of claim 5 wherein said pressure regulating valve includes a movable valve member received in a recess, spring means biasing the movable valve member outwardly from said recess to a closed condition, and means for venting the recess inwardly of the movable valve member to said fluid providing means.

14. The track idler adjusting and recoil apparatus of claim 5 wherein said wall means comprises a dividing wall extending transversely across said cylinder.

* * * * *